No. 869,874. PATENTED NOV. 5, 1907.
W. A. BERNARD.
REVOLVING EYELETING TOOL.
APPLICATION FILED MAR. 14, 1906.
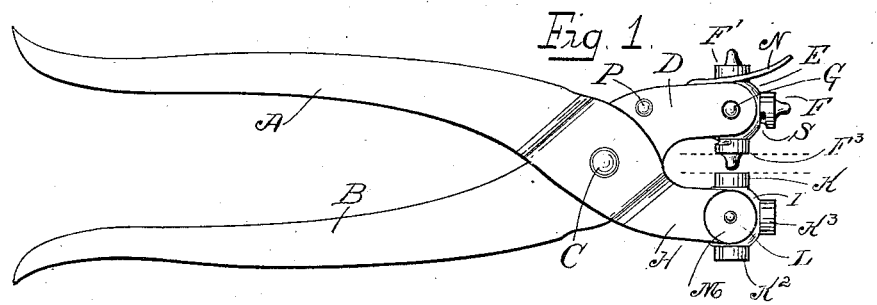
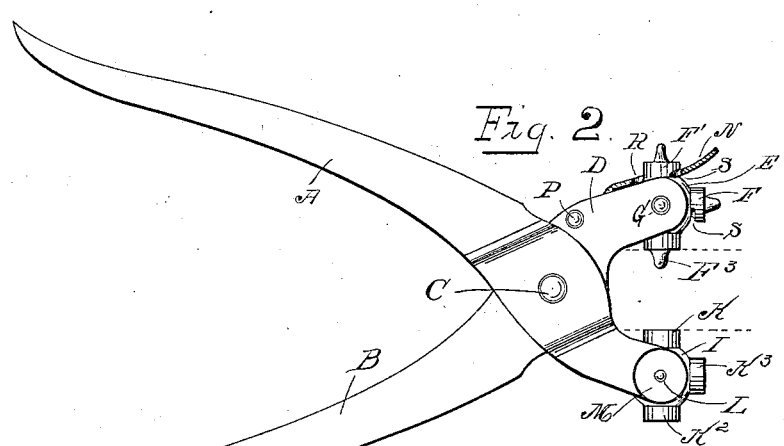
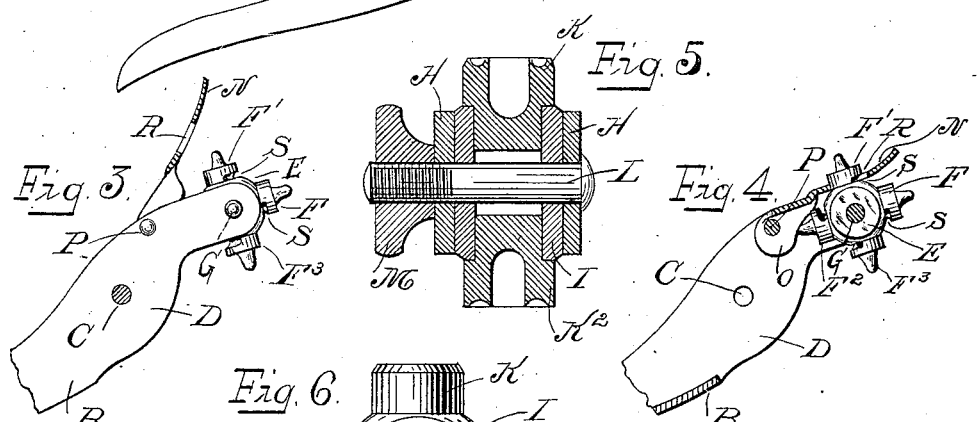
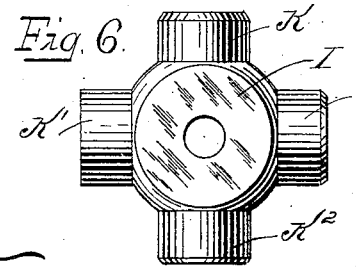
Witness
J. S. Coleman
A. E. Cooper
Inventor
William A. Bernard
by Beach & Fisher,
Attorneys.

UNITED STATES PATENT OFFICE.

WILLIAM A. BERNARD, OF NEW HAVEN, CONNECTICUT, ASSIGNOR TO THE WILLIAM SCHOLLHORN COMPANY, OF NEW HAVEN, CONNECTICUT, A CORPORATION OF CONNECTICUT.

REVOLVING EYELETING-TOOL.

No. 869,874.  Specification of Letters Patent.  Patented Nov. 5, 1907.

Application filed March 14, 1906. Serial No. 306,034.

*To all whom it may concern:*

Be it known that I, WILLIAM A. BERNARD, of the city and county of New Haven and State of Connecticut, have invented new and useful Improvements in Revolving Eyeleting-Tools, of which the following is a full, clear, and exact description, when taken in connection with the accompanying drawings, which form a part thereof, and in which:

Figure 1 represents a side elevation of an eyeleting tool embodying my invention, Fig. 2, a similar view, the jaws being shown further open, Fig. 3, a similar view of one of the jaws, with the locking device in its open position, Fig. 4, a longitudinal vertical section through the ends of one of the jaws showing the locking device closed or in engagement with the revolving head, Fig. 5, a transverse vertical section through the revolving head, and Fig. 6, a detailed side elevation of the same.

In all figures, similar letters of reference represent like parts.

This invention relates to revolving eyeleting tools, and more particularly to that class of eyeleting tools having a plurality of punches for punching holes for various sized eyelets, and a plurality of dies or anvils corresponding to the several punches. The invention has for its object the production of a tool in which both the punch and die are capable of nice adjustment in their relation with each other for operation on articles of various thicknesses, together with novel means for locking the punch and die in their adjusted positions. To these, among other ends, the invention consists of the improvements and combinations of parts set forth and claimed hereinafter.

Referring to the drawings for a more particular description, the parts designated by the letters A and B represent lever handles, having their forward ends forked in well known manner, and their tines pivoted at C. The forwardly projecting tines D of the handle B are adapted to embrace a revolving head E, carrying a plurality of eyeleting punches F, F', F² and F³. The head E is pivoted to the tines D by means of a pin or rivet G, projecting through the tines and head. The forwardly projecting tines H of the handle A embrace a revolving head I, carrying a plurality of eyeleting dies, K, K', K² and K³. The head I is secured to the tines H by means of a screw L, projecting through the same, and carrying at one end a nut M. When the nut M is screwed home on the screw L, the tines H will grip and hold by friction the head I from revolving. Between the tines D of the handle lever B is a locking plate N. The plate at one end has its sides O bent at right angles to form bearings for a pivot pin or rivet P which projects through the tines D. In the flat portion of the plate N is a perforation R somewhat larger than the diameter of the punches F, F', F² and F³, so that as shown more particularly in Figs. 2 and 4, when the locking plate N is swung downward so that the upper punch (as F'), will extend through the perforation, the head E is permitted a limited rotary movement from the position shown in Fig. 2 to that shown in Fig. 4. On the side of each of the punches F, F', F² and F³ is a notch S, adapted to receive, as shown more particularly in Fig. 2, the edge of the slot or perforation R, so as to hold the plate N from being swung upward on its pivot to release the punch.

When it is desired to adjust the tool to secure eyelets in a narrow article, the head I carrying the dies K, K', K² and K³ is rotated until the proper die (as K) is in the position to strike the under side of the article evenly, as indicated in Fig. 1. When so adjusted, the nut M is screwed down on the screw L to hold the head I from movement. Upon the closing of the punch, the head E carrying the punches is allowed, as above described, a limited movement so that the corresponding punch, as F³, projecting downward will come into alinement with the opening in the die K. If, however, it is desired to operate on a wider article, the lateral head I carrying the dies is adjusted, as above described, and upon the closing of the tool the head E carrying the punches will be permitted limited rotary movement to bring the lower punch, as F³, into alinement with the upper die as K, Fig. 2.

Having now described my invention, what I claim and desire to secure by Letters Patent, is:—

In a punch, the combination with cross lever handles; of jaws, one of which is forked; a revolving head pivotally mounted between the tines of said forked jaw; a plurality of punches carried by said head and a plate having depending pieces pivoted within said tines and having a perforation adapted to engage one of said punches to hold said head in its adjusted position, substantially as described.

In witness whereof, I have hereunto set my hand on the 10th day of March, 1906.

WILLIAM A. BERNARD.

Witnesses:
M. OLIVE WILLIAMS,
SAMUEL H. FISHER.